US008135011B2

(12) United States Patent
Wei et al.

(10) Patent No.: US 8,135,011 B2
(45) Date of Patent: Mar. 13, 2012

(54) METHOD FOR OPERATING MULTIPOINT CONTROL SYSTEM

(75) Inventors: Meng-Hsiu Wei, Hsinchu (TW); Hsien-Jen Chang, Hsinchu (TW); Chi-Chang Hung, Hsinchu (TW); Yung-Sheng Wei, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 217 days.

(21) Appl. No.: 12/134,258

(22) Filed: Jun. 6, 2008

(65) Prior Publication Data

US 2008/0304484 A1 Dec. 11, 2008

Related U.S. Application Data

(60) Provisional application No. 60/924,991, filed on Jun. 7, 2007.

(51) Int. Cl.
*H04L 12/56* (2006.01)

(52) U.S. Cl. ........................................................ 370/390

(58) Field of Classification Search ........................ None
See application file for complete search history.

(56) References Cited

U.S. PATENT DOCUMENTS

| | | | | |
|---|---|---|---|---|
| 4,746,898 | A * | 5/1988 | Loeppert | 341/70 |
| 5,999,541 | A * | 12/1999 | Hinchey et al. | 370/466 |
| 2004/0008155 | A1* | 1/2004 | Cok | 345/1.3 |

* cited by examiner

*Primary Examiner* — Yong Zhou
(74) *Attorney, Agent, or Firm* — WPAT, PC; Justin King

(57) ABSTRACT

The present invention provides method for operating a multipoint control system, which includes a plurality of controlled units serially connected and each controlled unit has a execution unit and an interpretive unit having a data processing unit and a memory unit, utilizes start packets pass through every one of controlled units which could be modified and transmitted to the next stage to achieve addressing for all of the system. Specifically, an information stream including a first start packet including a first leading message and a plurality of first data packets are transmitted by a controller, and a first address in the first start packet is modified by data processing unit and transmitted to the next stage. In addition, a first data packet corresponding to the first address is retrieved by the interpretive unit and the execution unit is enabled by the interpretive unit.

12 Claims, 7 Drawing Sheets

METHOD FOR OPERATING MULTIPOINT CONTROL SYSTEM

BACKGROUND OF THE INVENTION

1. Field of the Invention

This invention generally relates to a method for operating a multipoint control system. The invention more particularly relates to a method for operating a multipoint control system with serial data stream, especially is used for controlling lighting system such as LED lighting system.

2. Description of the Related Art

At present, there are three kinds of method to drive lighting device. One is that utilizing a control box for all of the lighting devices which coupled by several electric cables. This architecture is simple but one problem is a mount of cables is needed when a lots of lighting devices or distance between lighting device and the control box is too far, which costs too much. The second is common addressing bus architecture. The system is divided into several buses, each buses couple several lighting devices, each lighting device includes a control circuit and an unique ID, the system could work once power source and signal are provided. Common addressing bus architecture, however, includes several shortages such as a mount of lighting devices need setting different IDs, additional switches for controlling, EPROM cost, additional setting procedure, replacement of IDs when maintenance, etc. The third is serially connected controlling architecture. A lighting system includes a main control device to control several lighting devices, which could be divided into several sub-system coupled serially when the controlled point are far away from the main control device. Each sub-system serially connects each other, the main control device uses characteristic of shift registers to control data when and which device is transmitted to. Besides, a register signal is used to inform each controlled lighting device to capture data. In this way, it can simplify all of system in cable connection, setting and maintenance.

Referring to FIG. 1, it is a schematic diagram of a conventional control circuit of a serial connected lighting device. In fact, it is the third architecture described as above. In FIG. 1, it only shows five lighting device 101*a*-101*e*, cable signals 102 and 103 are the least need comprises data line DAT, clock line CLK, latch signal LE, output enable OE for brightness control, power source VDD and ground GND. Each of lighting devices 101*a*-101*e* coupled together by the connection signal 103.

Referring to FIG. 2, it is a block diagram of a lighting device shown in FIG. 1. There are only, but not limited to, four circuitry for explanation. Signal group 210 is input signal and signal group 211 is output signal. Four D type latches 203*a*~203*d* construct a S-R shift register which receives a clock CLKI, stores DATI sequentially into the latches 203*a*~203*d* and outputs inner data to the next lighting device through another data line DATAO.

After data shifting, the latch signal LEI drives four D type latches 203*a*~203*d* to output data to another group D type latches 202*a*~202*d*, then the LED driving circuit 201 drives the outside LED 213*a*~213*c*, the buffer 206 is an output buffer for buffering data signals. Besides, output buffer may be built in some system for transmitting OEI, LEI and CLKI which extend distance between each of serially connected devices by amplifying data signal and clock signal. But the data latch signal is needed because of the data shifting. Therefore, three signal lines are needed between one point and another. It costs more and the reliability is lower when there are lots of point and far distance between these points. To improve this architecture, one method called clock fail detect is used to drive lighting device serially connected system. This kind of system needs to stop clock signal unnaturally and also limits the application of frequency of clock signal. In addition, it needs to retransmit all of data even though only one point needs update.

The second architecture is a system called DMX-512 or 12C. Each one of points needs a preset address, for example, which set by external DIP switches or by a programmable non-volatile memory. But setting is inconvenient and also causes high cost when maintain a part of system. An external addressing method and address coordination mechanism is provided, but still increases cost and complexity of design.

It is understood that a method for operating a multipoint system is needed in this market. The method is expected low cost, needs less control signals and selectively random addressing.

BRIEF SUMMARY OF THE INVENTION

To solve the disadvantage of the prior art. The present invention provides a method for operating a multipoint control system which makes simple setting, low cost and easily maintain.

To achieve these aspects mentioned above, the present invention provides a method for operating a multipoint control system comprises providing the multipoint control system, wherein the multipoint control system includes a plurality of controlled units serially connected, each of the controlled units has a execution unit and an interpretive unit, each of the interpretive unit has a data processing unit and a memory unit; transmitting an information stream by a controller, wherein the information stream includes a first start packet and a plurality of first data packets, the first start packet includes a first leading message, a first address, and a first length message; modifying the first address by each of the data processing units included in each of the interpretive units according to the first leading message and transmitting to the next stage; retrieving the first data packet corresponding to the first address by each of the interpretive units according to the first address, the first length message; and enabling each of the execution units included in each of the interpretive units according to content of each of the first data packets.

The present invention also provides a method for operating a multipoint control system comprises (1) providing the multipoint control system, wherein the multipoint control system includes a plurality of controlled units serially connected, each of the controlled units has a execution unit and an interpretive unit, each of the interpretive unit has a data processing unit and a memory unit; (2) transmitting an information stream by a controller, wherein the information stream includes a first start packet, the first start packet includes a first leading message, and a first address; (3) modifying the first address by each of the data processing units included in each of the interpretive units according to the first leading message and transmitting to the next stage; (4) retrieving addresses of the controlled units by each of the interpretive units according to each of the first addresses and storing address in the memory units; (5) transmitting a second information stream to the interpretive units, the second information stream includes a second start packet and at least one second data packet, the second start packet has a second leading message and a second address; and (6) retrieving contents of the second data packet to enable each of the execution units according to the addresses stored in the memory unit and each of the second addresses, and back to the step (5).

By doing so, the system can support multipoint fast addressing, does not need additional addressing hardware, has less signal lines and function of random addressing. In addition, it does not transmit all of data but only transmits data and address for the corresponding updated point to change the status of the controlled unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
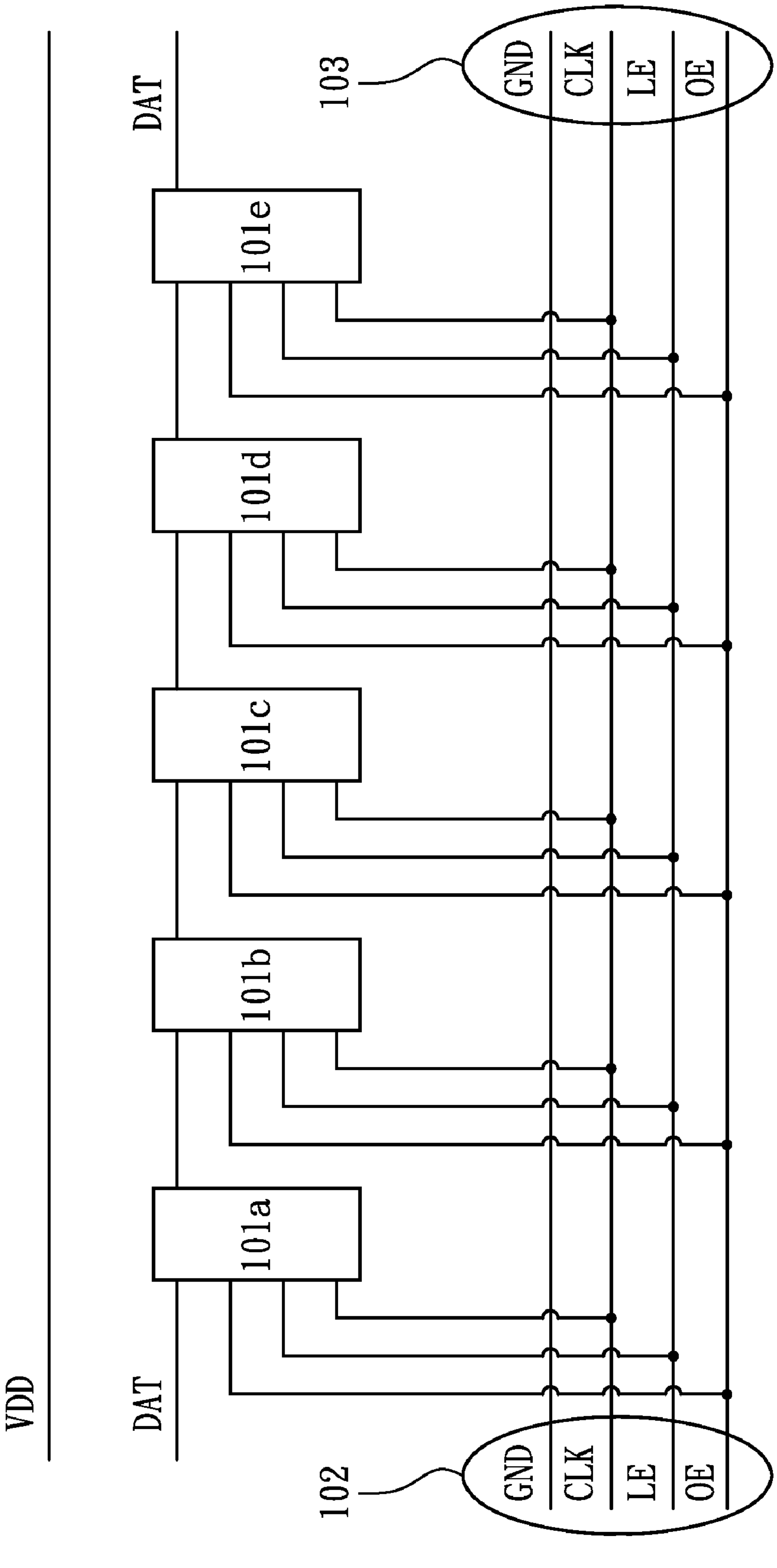
FIG. 1 (PRIOR ART)
FIG. 1 is a schematic diagram of a conventional control circuit of a serial connected lighting device.
Figure 2:
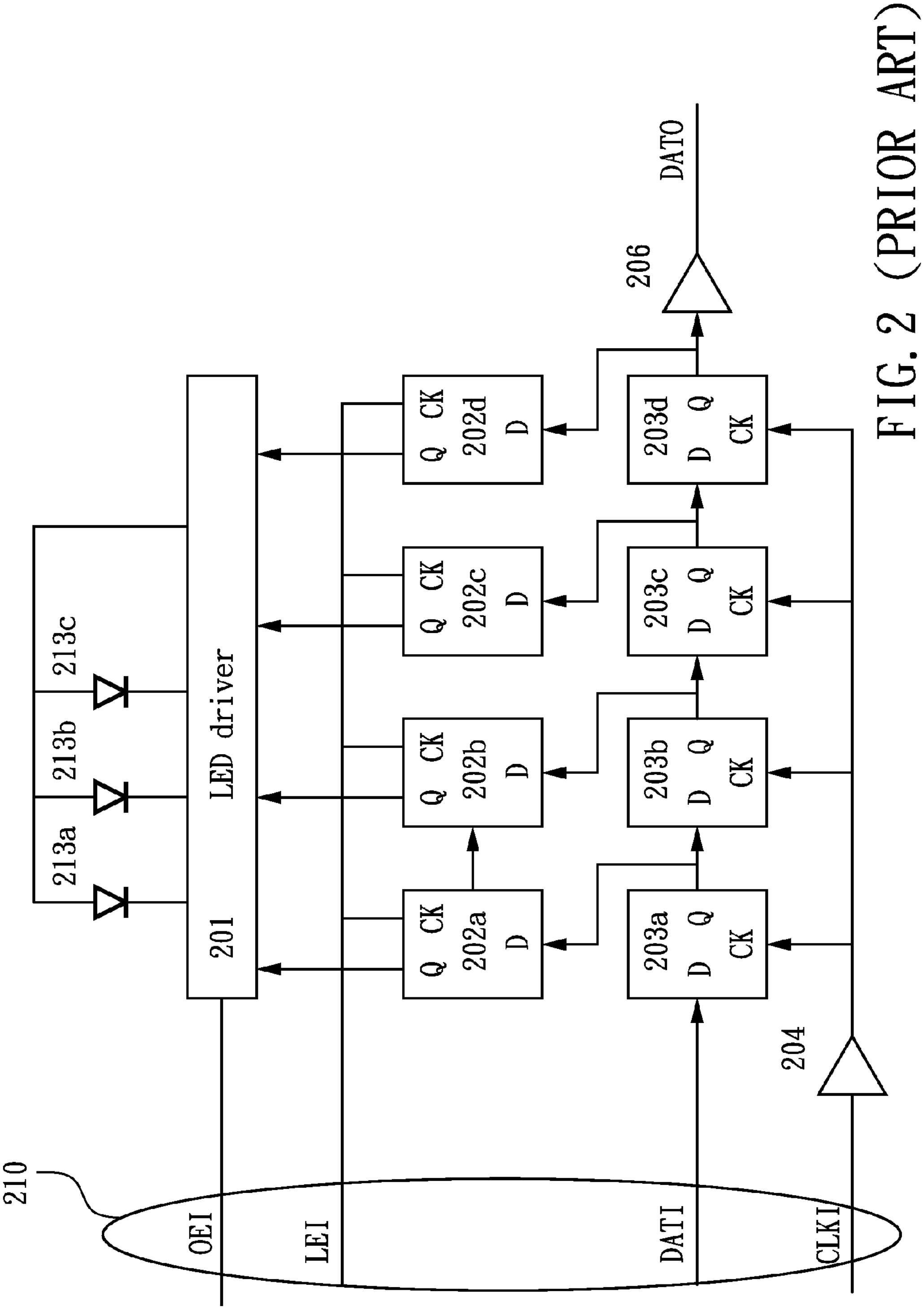
FIG. 2 (PRIOR ART)
FIG. 2 is a block diagram of a lighting device shown in FIG. 1.

Several exemplary embodiments of the invention are described with reference to FIGS. 3 through 7, which generally relate to a method for operating a multipoint control system. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 3:
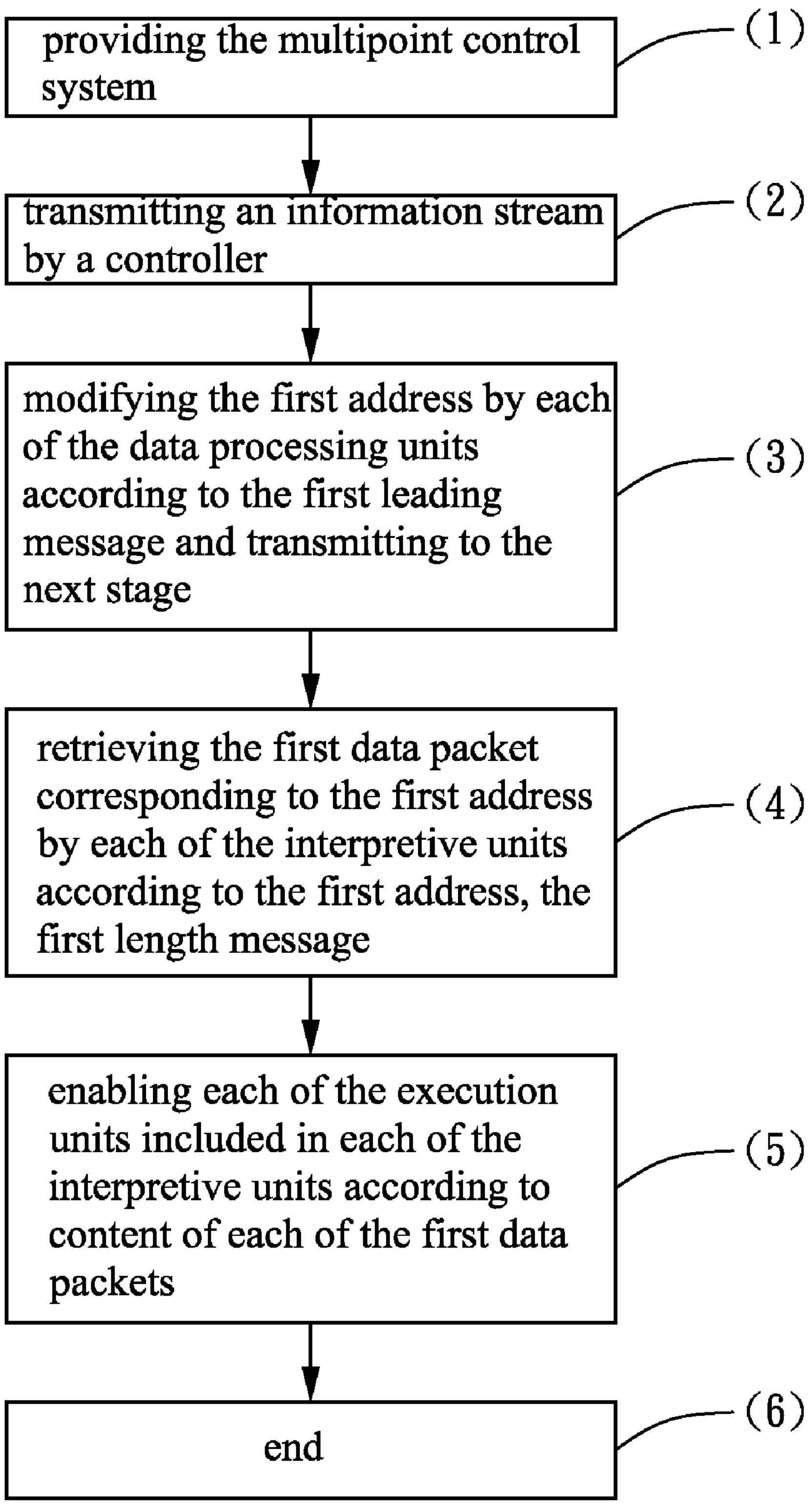
FIG. 3 is a flow chart for illustrating a method for operating a multipoint control system according to an embodiment of the present invention.

Referring to FIG. 3, it is a flow chart for illustrating a method for operating a multipoint control system according to an embodiment of the present invention. The method comprises the following steps:

(1) providing the multipoint control system, wherein the multipoint control system includes a plurality of controlled units (for example, a LED driver and LED) serially connected, each of the controlled units has a execution unit (for example, LED) and an interpretive unit, each of the interpretive unit has a data processing unit and a memory unit, wherein the information stream is composed of a clock signal and a data signal or a couples of signals which could be decoded to the clock signal and the data signal.

(2) transmitting an information stream by a controller (for example, a control IC), wherein the information stream includes a first start packet and a plurality of first data packets, the first start packet includes a first leading message, a first address, and a first length message, wherein the information stream is composed of a clock signal and a data signal or a couples of signals which could be decoded to the clock signal and the data signal.

(3) modifying the first address by each of the data processing units included in each of the interpretive units according to the first leading message and transmitting to the next stage, but other information is not changed.

(4) retrieving the first data packet corresponding to the first address by each of the interpretive units according to the first address, the first length message. Because each of controlled units is serially connected, the first data packet corresponding to each of controlled units arrives in different time slot. For synchronization, the controller may selectively transmit the first data packet which has long propagation delay before transmit the first data packet having short propagation delay.

(5) enabling each of the execution units included in each of the interpretive units according to content of each of the first data packets. Each of the controlled unit calculates time of arrival of the first data packet selectively based on first address, the first length message and propagation delay between stages to achieve action synchronously.

(6) End of this procedure.

Figure 4:
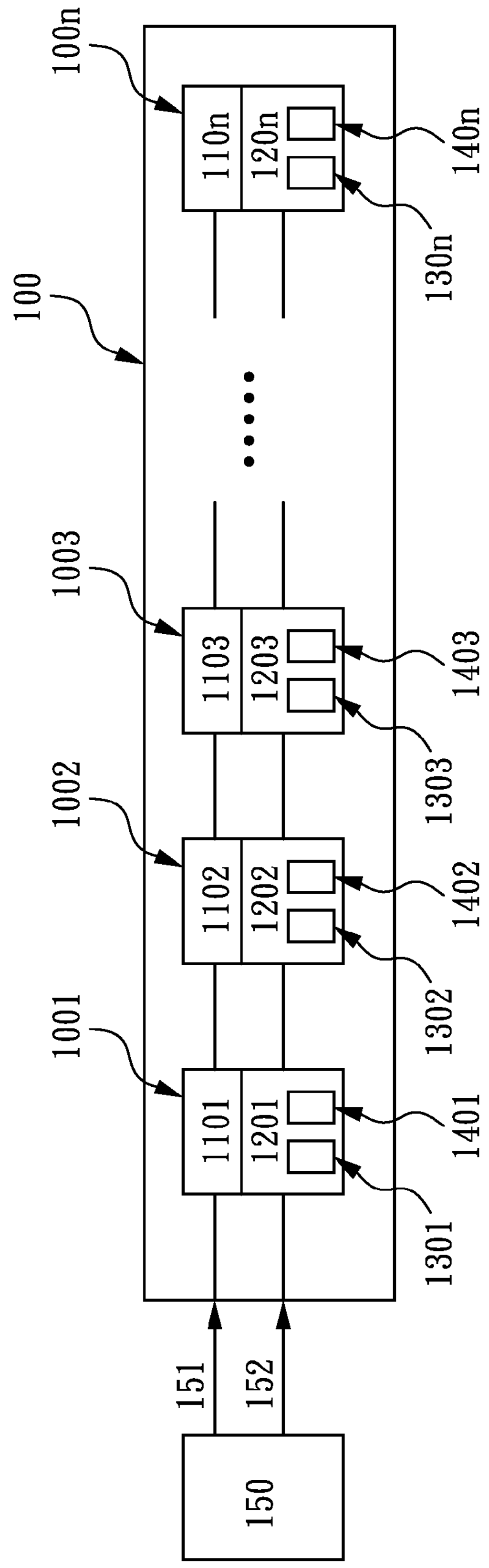
FIG. 4 is a schematic diagram of a multipoint control system according to one embodiment of the present invention.
Figure 5:
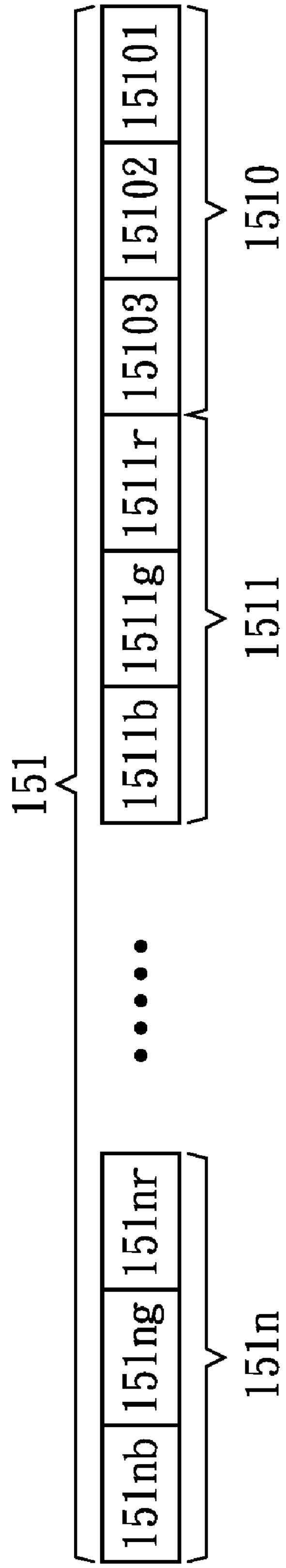
FIG. 5 is a schematic diagram of a first data information stream according to an embodiment of the present invention.

Referring to FIG. 4, it is a schematic diagram of a multipoint control system according to one embodiment of the present invention. FIG. 5 is a schematic diagram of a first data information stream according to an embodiment of the present invention. Please refer FIG. 3 to FIG. 5 at the same time. In FIG. 4, a multipoint control system 100 is provided. The multipoint control system 100 includes a plurality of controlled units 1001-100*n* (for example, the controlled unit includes a LED driver and LED). Each of the controlled unit 1001-100*n* includes an execution unit 1101-110*n* (for example, LED) and an interpretive unit 1201-120*n*, each of interpretive unit 1201-120*n* includes a data processing unit 1301-130*n* and a memory unit 1401-140*n*. A controller 150 (for example, a control IC) transmits a data stream as shown in FIG. 5. The data stream includes a first start packet 1510 and a plurality of first data packet 1511-151*n*, wherein the packet 1511 belongs to the last stage of controlled units. The first start packet is followed by the packet 1511. The last transmitted packet 151*n* belongs to the controlled unit directly connected to the controller 150. The first packets 1511-151*n* includes first red light information 1511*r*-1511*nr*, first green light 1511*g*-151*ng* and first blue light information 1511*b*-151*nb*. The first start packet 1510 includes a first leading message 15101, a first address 15102 and a first length information 15103, wherein the information stream 170 is composed of a clock signal 172 and a data signal 171 or the information stream 171 is composed of signals which could be decoded to the clock signal 172 and the data signal 171. Each of interpretive units 1201-120*n* makes the data processing unit 1301-130*n* to modify the first address 15102 and transmit to the next stage. Each of the interpretive units retrieves a first data packet 1511-151*n* corresponding to a first address 15102 according to the first address 15102 and the first length information 15103, and stores first data packet 1511-151*n* in the memory units 1401-140*n*. It is noted that counting of each of data processing unit 1301-130*n* is different because the interpretive unit 1201-120*n* refers the first leading message 15101. That means every one of the controlled units 1001-100*n* has different address. Each one of the interpretive units 1201-120*n* drives each of execution units 1101-110*n* according to the content of each of the first data packets 1511-151*n*. This invention, in this way, is provided to transmit a first data stream 151 to a multipoint control system 100 which could address and drive the controlled units 1001-100*n* soon and decrease complexity of addressing of the controlled units 1001-100*n*. Besides, every one of the controlled unit 1001-100*n* could operate synchronously. Even if the data stream is not arranged as above, each of the controlled unit can calculates time of arrival of the first data packet selectively based on first address 15102, the first length message 15103 and propagation delay between stages to achieve action synchronously.

Figure 6:
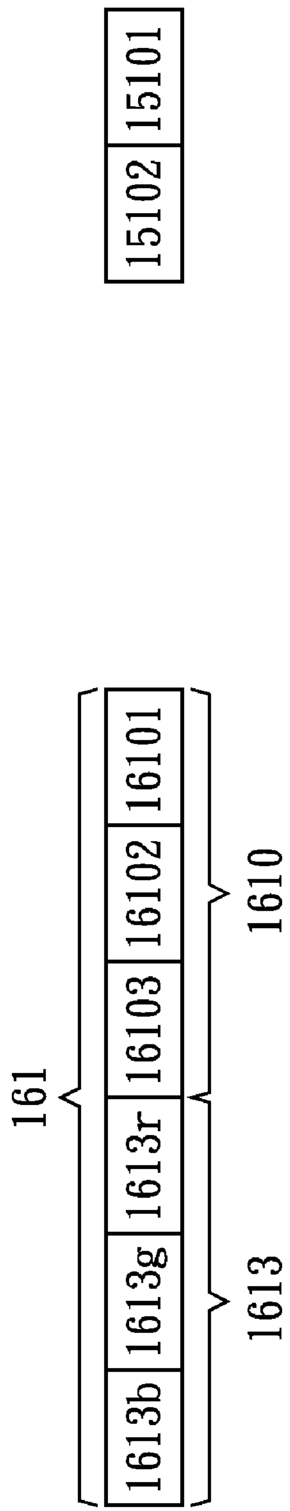
FIG. 6 is a schematic diagram of a second data information stream according to an embodiment of the present invention.

Referring to FIG. 6, it is a schematic diagram of a second data information stream according to an embodiment of the present invention. Please also refer to FIG. 3 and FIG. 4. In this embodiment, a plurality of controlled units 1001-100*n* are addressed by the first leading message 15101 and the first address 15102. For example, if a user wants to change status of one of the controlled units (ex. the unit 1003), the controller 150 only transmits a second data stream 161 to the interpretive units 1201-120*n*, wherein the second data stream 161 includes a second start packet 1610 and at least one second data packet 1613. The second data packet 1613 includes second red light information 1613*r*, second green light 1613*g* and second blue light information 1613*b*. The second start packet 1610 includes a second leading message 16101, a second address 16102 and a number change information 16103. Each of interpretive units 1201-120*n* receives the second leading message 16101, makes the data processing unit 1301-130*n* to modify the second address 16102 and transmits to the next stage. Each interpretive units 1201-120*n* retrieves the second data packet 1613 to enable each of execution units 1101-110*n* according to the address stored in the memory unit 1401-140*n* and the second address 16102. By doing so, it needs not to transmit all of data packet for controlling one of the controlled units, it needs only repeat the steps as described above.

Figure 7:
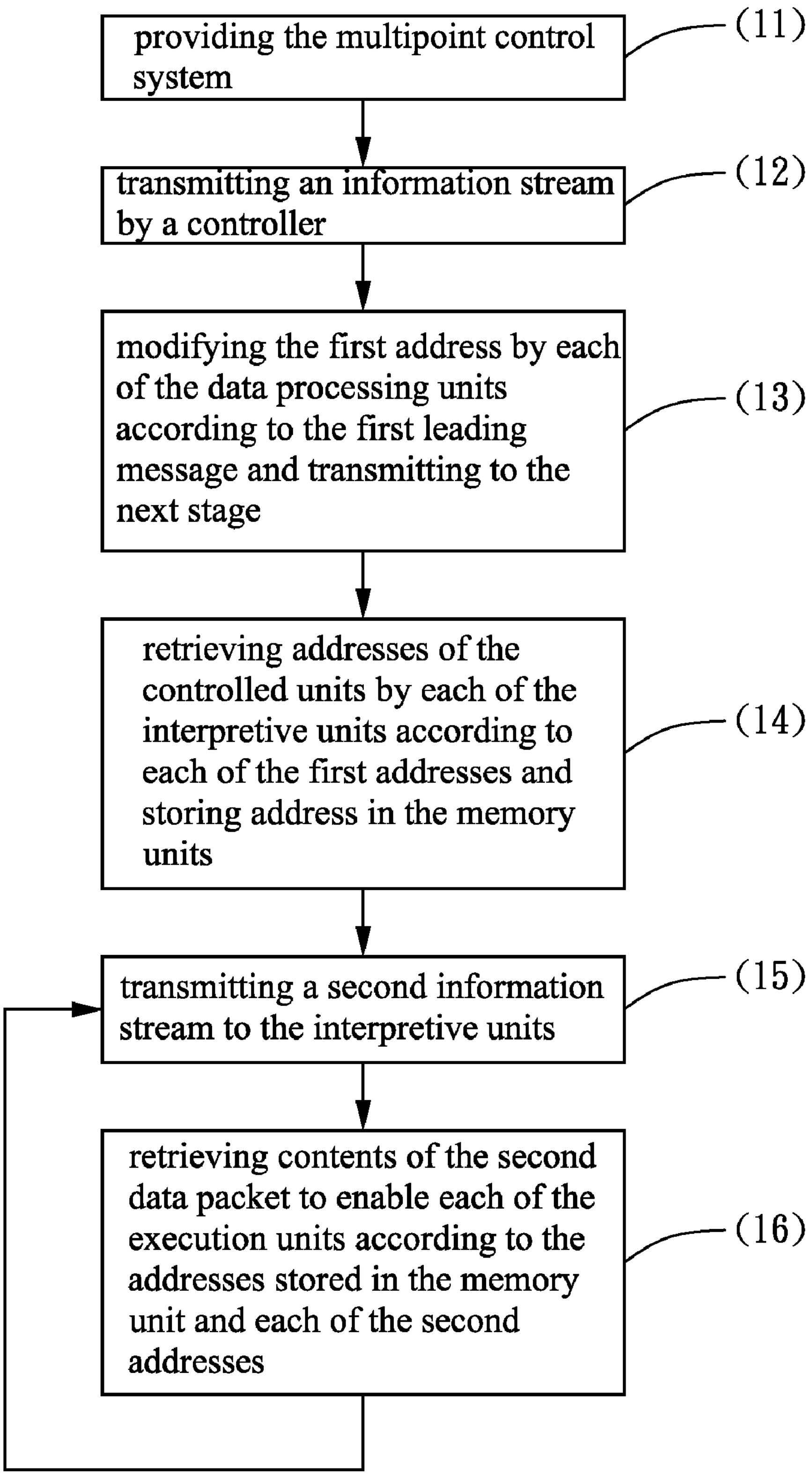
FIG. 7 is a flow chart for illustrating a method for operating a multipoint control system according to another embodiment of the present invention.

Referring to FIG. 7, it is a flow chart for illustrating a method for operating a multipoint control system according to another embodiment of the present invention. The method comprises the steps as follow:

(11) providing the multipoint control system, wherein the multipoint control system includes a plurality of controlled units (for example, LED driver and LED) serially connected, each of the controlled units has a execution unit and an interpretive unit, each of the interpretive unit has a data processing unit and a memory unit.

(12) transmitting an information stream by a controller, wherein the information stream includes a first start packet, the first start packet includes a first leading message, and a first address, wherein the information stream is composed of a clock signal and a data signal or the information stream is composed of signals which could be decoded to the clock signal and the data signal;

(13) modifying the first address by each of the data processing units included in each of the interpretive units according to the first leading message and transmitting to the next stage but other information is not changed.

(14) retrieving addresses of the controlled units by each of the interpretive units according to each of the first addresses and storing address in the memory units;

(15) transmitting a second information stream to the interpretive units, the second information stream includes a second start packet and at least one second data packet, the second start packet has a second leading message, a second address and a change number information; and

(16) retrieving contents of the second data packet to enable each of the execution units according to the addresses stored in the memory unit and each of the second addresses, and back to the step (15).

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for operating a multipoint control system, comprising:

providing the multipoint control system, wherein the multipoint control system includes a plurality of controlled units serially connected, each of the controlled units has a execution unit and an interpretive unit, each of the interpretive unit has a data processing unit and a memory unit;

transmitting an information stream by a controller, wherein the information stream includes a first start packet and a plurality of first data packets, the first start packet includes a first leading message, a first address, and a first length message;

modifying the first address by each of the data processing units of a present controlled unit included in each of the interpretive units according to the first leading message and transmitting to the next controlled unit;

retrieving the first data packet corresponding to the first address by each of the interpretive units according to the first address, the first length message; and enabling each of the execution units included in each of the interpretive units according to content of each of the first data packets;

wherein the first data packet having long propagation delay is selectively transmitted by the controller before the first data packet having short propagation delay so as to synchronously transmit the plurality of first data packets to the controlled units.

2. The method as claimed in claim 1, wherein the controlled unit is a lighting device.

3. The method as claimed in claim 1, wherein the controlled unit comprises a LED driver and a LED.

4. The method as claimed in claim 1, wherein the information stream is composed of a clock signal and a data signal.

5. The method as claimed in claim 4, wherein the information stream is composed of signals which could be decoded to the clock signal and the data signal.

6. The method as claimed in claim 1, wherein time of arrival of the first data packet is selectively calculated by the each of the controlled unit according to the first address, the first length message and propagation delay between stages.

7. A method for operating a multipoint control system, comprising:

(1) providing the multipoint control system, wherein the multipoint control system includes a plurality of controlled units serially connected, each of the controlled units has a execution unit and an interpretive unit, each of the interpretive unit has a data processing unit and a memory unit;

(2) transmitting an information stream by a controller, wherein the information stream includes a first start packet and a plurality of first data packets, the first start packet includes a first leading message, and a first address;

(3) modifying the first address by each of the data processing units included in each of the interpretive units according to the first leading message and transmitting to the next controlled unit;

(4) retrieving the first data packet corresponding to the first address and retrieving addresses of the controlled units by each of the interpretive units according to each of the first addresses and storing address in the memory units;

(5) transmitting a second information stream to the interpretive units, the second information stream includes a second start packet and at least one second data packet, the second start packet has a second leading message and a second address; and (6) retrieving contents of the second data packet to enable each of the execution units according to the addresses stored in the memory unit and each of the second addresses, and back to the step (5);

wherein the first data packet having long propagation delay is selectively transmitted by the controller before the first data packet having short propagation delay so as to synchronously transmit the plurality of first data packets to the controlled units.

8. The method as claimed in claim 7, wherein the controlled unit is a lighting device.

9. The method as claimed in claim 7, wherein the controlled unit comprises a LED driver and a LED.

10. The method as claimed in claim 7, the information stream is composed of a clock signal and a data signal.

11. The method as claimed in claim 10, wherein the information stream is composed of signals which could be decoded to the clock signal and the data signal.

12. The method as claimed in claim 7, wherein the second data packet having long propagation delay is selectively transmitted by the controller before the second data packet having short propagation delay so as to synchronously transmit plurality of second data packet to the controlled units.

* * * * *